(12) United States Patent
Takahashi et al.

(10) Patent No.: US 10,533,725 B2
(45) Date of Patent: Jan. 14, 2020

(54) CASE STRUCTURE FOR REAR COMBINATION LAMP IN AUTOMOBILE

(71) Applicants: TOYOTA JIDOSHA KYUSHU KABUSHIKI KAISHA, Miyawaka-shi, Fukuoka-ken (JP); TOYOTA JIDOSHA KABUSHIKI KAISHA, Toyota-shi, Aichi-ken (JP)

(72) Inventors: Yuki Takahashi, Miyawaka (JP); Atsushi Nishimura, Miyawaka (JP); Nobuyuki Tomatsu, Nagoya (JP); Hideaki Iida, Nagoya (JP); Yuya Yamashita, Toyota (JP); Kunikatsu Hisatomi, Mishima (JP); Koushi Yamada, Odawara (JP); Yoichiro Kasai, Nagoya (JP)

(73) Assignees: TOYOTA JIDOSHA KYUSHU KABUSHIKI KAISHA, Miyawaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/287,095

(22) Filed: Feb. 27, 2019

(65) Prior Publication Data
US 2019/0263459 A1 Aug. 29, 2019

(30) Foreign Application Priority Data

Feb. 27, 2018 (JP) .................................. 2018-033573

(51) Int. Cl.
*F21S 43/00* (2018.01)
*B60Q 3/60* (2017.01)
*B60Q 3/70* (2017.01)

(52) U.S. Cl.
CPC ................ *F21S 43/00* (2018.01); *B60Q 3/60* (2017.02); *B60Q 3/70* (2017.02); *B60Q 2200/00* (2013.01); *B60Q 2400/00* (2013.01)

(58) Field of Classification Search
CPC ........ B60Q 3/60; B60Q 3/70; B60Q 2200/00; B60Q 2400/00; F21S 43/00
See application file for complete search history.

(56) References Cited

FOREIGN PATENT DOCUMENTS

| FR | 3 021 926 A1 | 12/2015 |
|---|---|---|
| JP | 2004-210138 A | 7/2004 |
| JP | 2015-083459 A | 4/2015 |

OTHER PUBLICATIONS

Sep. 12, 2019 Extended Search Report issued in European Patent Application No. 19159118.9.

(Continued)

*Primary Examiner* — Joseph L Williams
*Assistant Examiner* — Jose M Diaz
(74) *Attorney, Agent, or Firm* — Oliff PLC (57) ABSTRACT

Disclosed is a case structure for a rear combination lamp in an automobile in which a rear combination lamp case in a corner portion formed in a rear portion of a vehicle is formed in a corner case having a substantial triangle pyramid shape by a rear plate, a side plate and a planner plate,
wherein the rear plate forms a case rear face on which a concave notch portion is formed in a substantial center,
wherein the side plate forms an air communication side face which is formed so as to gradually become narrower width toward a rear thereof, and
wherein the planner plate forms a concave air communication path in a center thereof so that a terminal end of the concave air communication path communicates with the concave notch portion of the rear plate.

2 Claims, 10 Drawing Sheets

(56) References Cited

OTHER PUBLICATIONS

Lexus UX Rear Light Bar to Become "New Lexus Signature Feature," Lexus Enthusiast, <https://lexusenthusiast.com/2018/03/22/lexus-ux-rear-light-bar-to-become-new-lexus-signature-feature/>, Mar. 22, 2018.

CASE STRUCTURE FOR REAR COMBINATION LAMP IN AUTOMOBILE

BACKGROUND OF THE INVENTION

1. Field of the Invention

The present invention relates to a case structure for a rear combination lamp through which running stability and steering stability can be improved by ameliorating a lamp case covering a rear combination lamp arranged in right and left rear portions of a body of an automobile.

2. Description of Related Art

Conventionally, steering stability or operation stability of a vehicle is attempted by a shape of rear wing arranged at the rear portion of the body or a stabilizing fin provided in resin parts arranged at the rear portion of the body or aerodynamic control corresponding to form of rear lamp.

For example, in Japanese Patent Application Laid-open No. 2015-083459, it is disclosed a technology concerning side structure of a moving body in which air flow is rectified by a rectification fin provided at a side portion of the moving body, thereby steering stability of the moving body can be improved.

Further, in Japanese Patent Application Laid-open No. 2004-210138, it is disclosed a technology to improve stability of the body at high speed driving by adopting constitution that a peeling position from the body of air flow flowing along the vehicle body from the vehicle front portion can be rectified by protruding the rear combination lamp in a curved portion of rear fender panel.

SUMMARY OF THE INVENTION

However, in the rectification fin disclosed in Japanese Patent Application Laid-open No. 2015-083459, although appropriate aerodynamic performance can be demonstrated by preventing turbulent flow, a predetermined effect can be expected only when installation location of the rectification fin is in the resin parts on the body side face. Therefore, there is a problem that form of the vehicle is restricted and degree of freedom in design is compromised.

Further, in the rear combination lamp disclosed in Japanese Patent Application Laid-open No. 2004-210138, there is a problem: in a case that the rear combination lamp does not have a specific shape, steering stability cannot be improved and degree of freedom in design is compromised.

Accordingly, the present invention will provide a case structure for a rear combination lamp through which steering stability on the basis of aerodynamic control can be attempted by providing rear wing function according to ameliorating form of a rear combination lamp case and there is not fear that degree of freedom in design is compromised.

According to one aspect of the present invention, it is provided a case structure for a rear combination lamp in an automobile in which a rear combination lamp case in a corner portion formed in a rear portion of a vehicle is formed in a corner case having a substantial triangle pyramid shape by a rear plate, a side plate and a planner plate, wherein the rear plate forms a case rear face on which a concave notch portion is formed in a substantial center, wherein the side plate forms an air communication side face which is formed so as to gradually become narrower width toward a rear thereof, and wherein the planner plate forms a concave air communication path in a center thereof so that a terminal end of the concave air communication path communicates with the concave notch portion of the rear plate.

Further, according to another aspect of the present invention, it is provided the case structure, wherein the concave air communication path formed in the planner plate is formed so as to gradually become wider width from a front to a rear thereof.

According to the case structure for a rear combination lamp in an automobile corresponding to one aspect of the present invention, the rear combination lamp case in a corner portion formed in a rear portion of a vehicle is formed in a corner case having a substantial triangle pyramid shape by a rear plate, a side plate and a planner plate, wherein the rear plate forms a case rear face on which a concave notch portion is formed at a substantial center, wherein the side plate forms an air communication side face which is formed so as to gradually become narrower width toward a rear thereof, and wherein the planner plate forms a concave air communication path in a center thereof so that a terminal end of the concave air communication path communicates with the concave notch portion of the rear plate.

Therefore, air communicating from front when driving the automobile produces a downforce in the rear portion of a body through the rear combination lamp case when air communicates in the concave air communication path, thereby steering stability of a vehicle can be improved by certainly grounding tires on the road surface. Further, based on this rear combination lamp case, since steering stability of the vehicle can be improved according to an outline shape of the case, it is not necessary to especially add a specific shape member for forming the air communication path, thereby there is an effect that degree of freedom in design of the vehicle can be improved.

According to the case structure corresponding to another selective aspect of the present invention, the concave air communication path formed in the planner plate is formed so as to gradually become wider width from a front to a rear thereof, therefore steering stability at driving can be improved based on that air flow passes without disturbing air flow communicating along the vehicle while driving and vehicle behavior is made stable.

DESCRIPTION OF THE PREFERRED EMBODIMENT(S)

The gist of the present invention lies in that a rear combination lamp case in a corner of a body rear portion is formed in a corner case having a substantial triangle pyramid shape by enclosing a rear plate, a side plate and a planner plate, wherein the rear plate forms a rear case face on which a concave notch portion is formed in a substantial center thereof, the side plate forms an air communication side face shaped so as to gradually become narrower width toward a rear thereof, the planner plate forms a concave air communication path a terminal end of which communicates with the concave notch portion of the rear plate in a center thereof, and the concave air communication path formed in the planner plate is formed so as to gradually become wider width from a body front over a body rear.

The embodiment of the present invention will be described in detail with reference to FIGS. 1 to 11.

Figure 1:
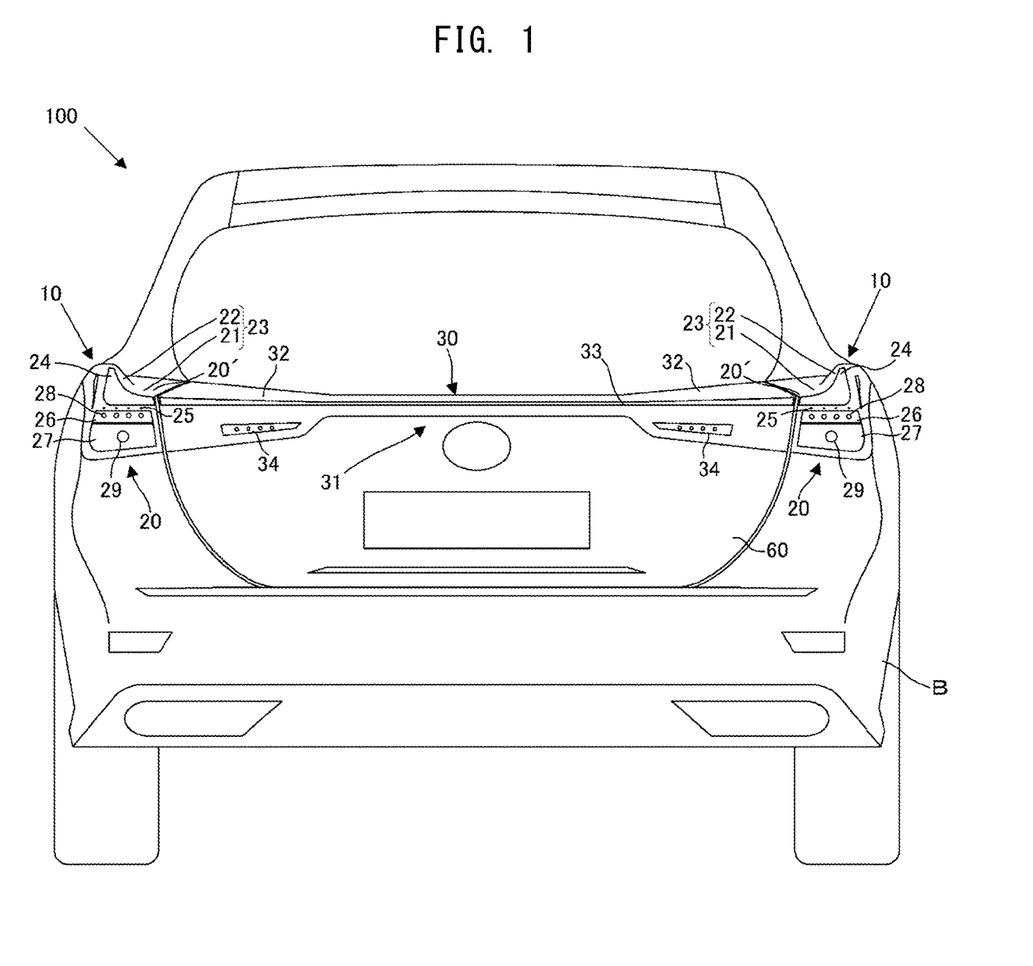
FIG. 1 is a rear view of an automobile in the embodiment according to the present invention.
Figure 2:
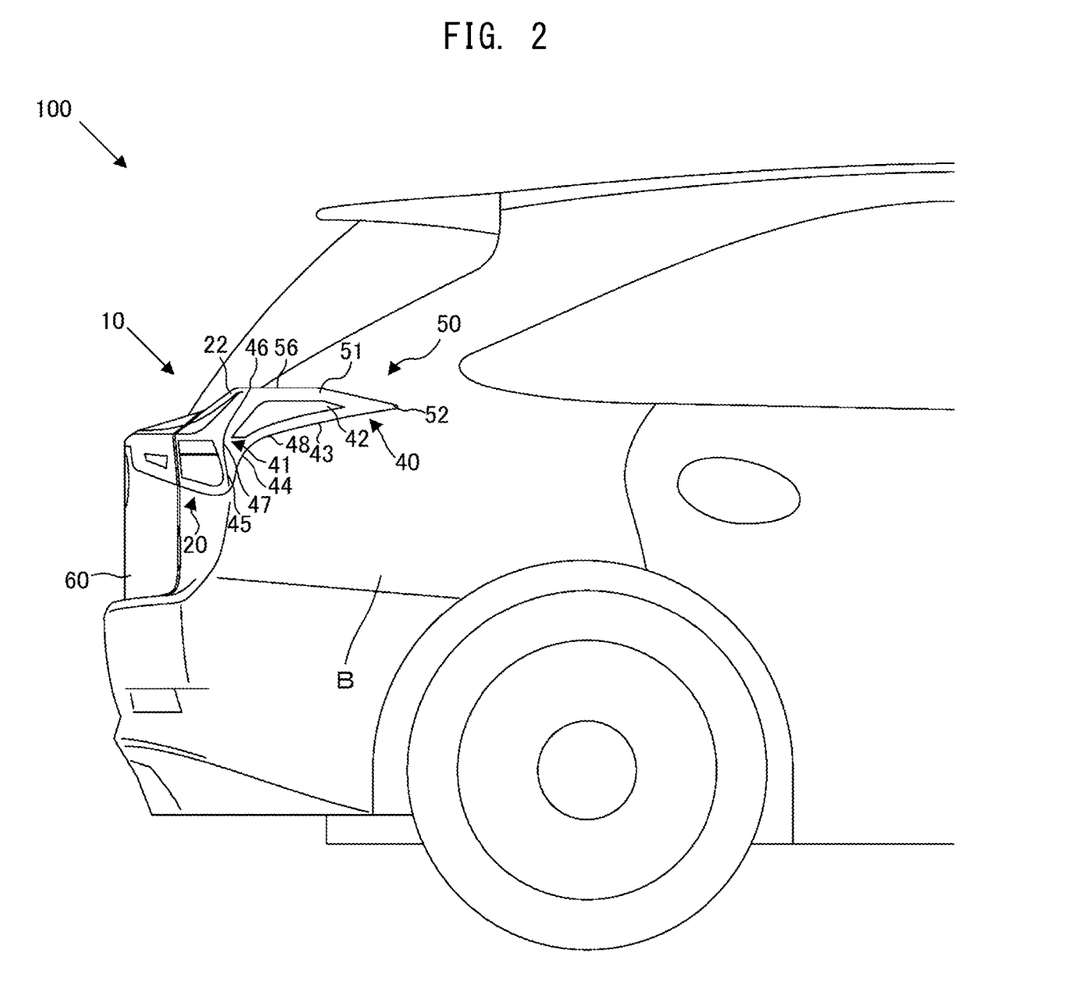
FIG. 2 is a side view of a vehicle rear portion of the automobile in the embodiment according to the present invention.
Figure 4:
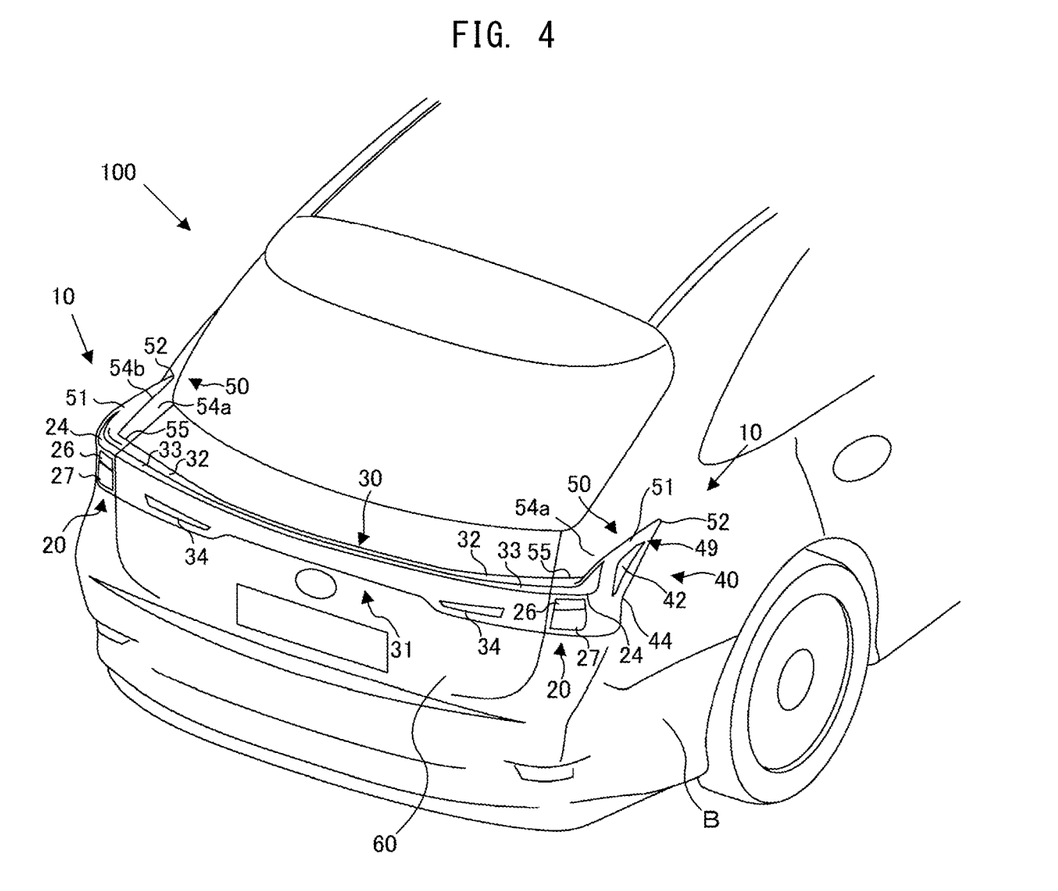
FIG. 4 is a perspective view of the vehicle rear portion of the automobile in the embodiment according to the present invention.
Figure 5:
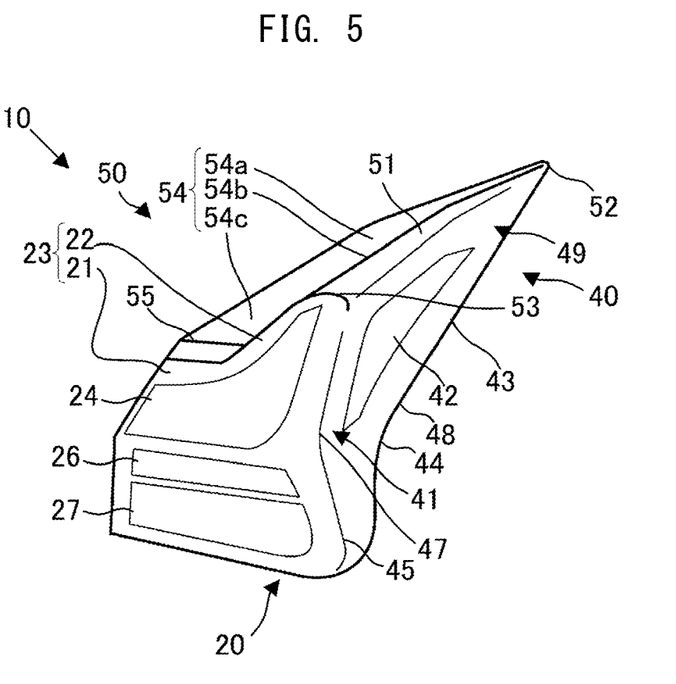
FIG. 5 is a perspective view showing a rear combination lamp case in the embodiment according to the present invention.

In a rear portion of a vehicle 100 of the present embodiment, as shown in FIGS. 1 and 4, there are provided rear combination lamp cases 10, 10 formed at left and right end portions in a vehicle width direction, a non-lighting area 30 arranged between the rear combination lamp cases 10, 10 and a back door 60 positioned in front of the non-lighting area 30.

Each of the rear combination lamp cases 10, 10 is constituted from a rear plate 20 positioned at a rear portion of the vehicle 100, a side plate 40 formed at a side face of the vehicle 100 continuously to the rear plate 20 and a planner plate 50 continuing to an upper end portion of the rear plate 20 and an upper end portion of the side plate 40. The rear combination lamp case 10 is constituted in a substantial triangular pyramid shape by combining three plates.

Figure 6:
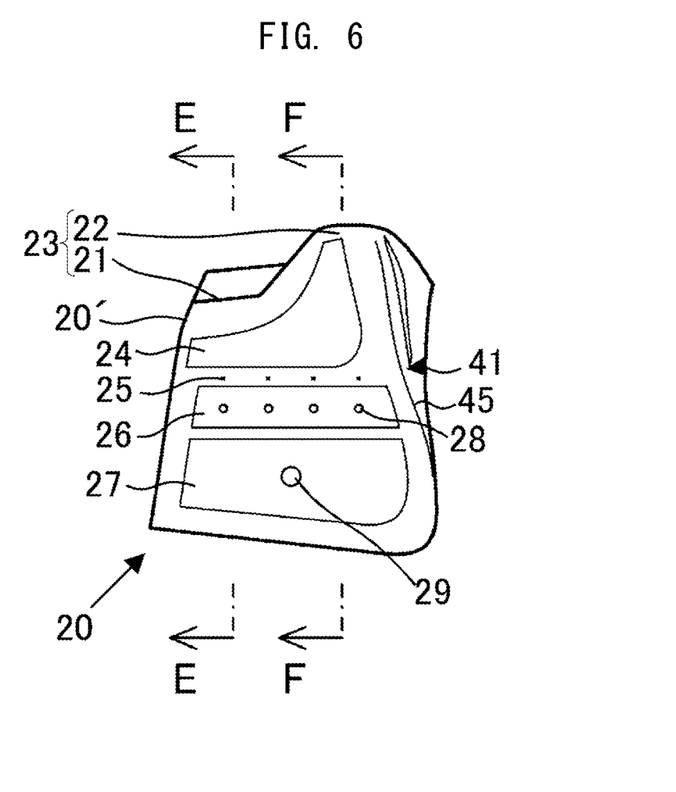
FIG. 6 is a rear view showing the rear combination lamp case in the embodiment according to the present invention.

As shown in FIGS. 1 and 6, the rear plate 20 has a substantial rectangular shape in rear view and in the rear plate 20, a notch portion 21 is formed to a side end portion 20' formed in an inner side along left and right direction of the vehicle 100 from a substantial center portion along left and right direction of the upper end portion. Further, it is formed a protrusion 22 inclined in a climbing direction to a side face portion side of the vehicle 100 from a substantial center portion in left and right direction of the upper end portion of the rear plate 20. This notch portion 21 and the protrusion 22 are smoothly connected with each other, thereby constitutes a concave notch portion 23.

Inside the rear plate 20, that is, in the rear combination lamp case 10, there are arranged in a vehicle body B from an upper potion to a lower portion a reflection plate 24, a composite lamp 25, a stop lamp 26 and a turn lamp 27.

The reflection plate 24 is constituted in a substantial L-shape along the concave notch portion 23 of the rear plate 20. Further, the reflection plate 24 reflects light when light is illuminated from vehicle rear and can inform vehicle width of the vehicle 100 to a backward vehicle even if lamps of the vehicle 100 mentioned later are not turned on when parked/stopped. Based on that end portion of the reflection plate 24 at the side face portion side of the vehicle 100 is formed in a shape pushed up, positions of left and right end portions of the vehicle 100 can be easily recognized.

The composite lamp 25 positions at a lower portion of the reflection plate 24 and is a lamp functioning in conjunction with the stop lamp 26 and the turn lamp 27 mentioned later. The composite lamp 25 is formed in a substantial circle shape in rear view.

The stop lamp 26 is formed in a substantial rectangular shape in rear view and is constituted from four light emitting portions 28, condenser lens (not shown) arranged to each rear portion of the light emitting portion 28 to condense light illuminated from the light emitting portion 28 and a reflection plate (not shown) arranged between the light emitting portions 28 to reflect light being incident from the rear plate 20.

Here, although the number of the light emitting portion 28 in the stop lamp 26 is set to four in the present embodiment, such number of the light emitting portion 28 is not limited to this.

The turn lamp 27 is formed in a substantial rectangular shape in rear view and has a light emitting portion 29 arranged at a substantial center portion. To a rear portion of the light emitting portion 29, it is arranged a condenser lens (not shown) to condense light illuminated from the light emitting portion 29. Further, the turn lamp 27 is constituted in a stepwise fashion in planner view so as to gradually become wider width toward the rear direction of the vehicle 100. Reflection plate (not shown) are arranged on faces in a stepwise fashion.

As shown in FIGS. 2, 7, 9A and 9D, the side plate 40 is formed in a substantial triangle shape in side view. The side plate 40 constitutes an obtuse junction 46 by connecting two ridgeline portions 45, 56 of a side end ridgeline portion 45 (see FIG. 9D) formed at a side end portion in the vehicle width direction of the rear plate 20 and a ridgeline portion 56 (see FIG. 9A) in the protrusive ridge portion 51 (see FIG. 9A) of the planner plate 50 with the substantial same shape in rear view as the protrusion 22 of the rear plate 20 extended to the front of the vehicle 100.

Figure 7:
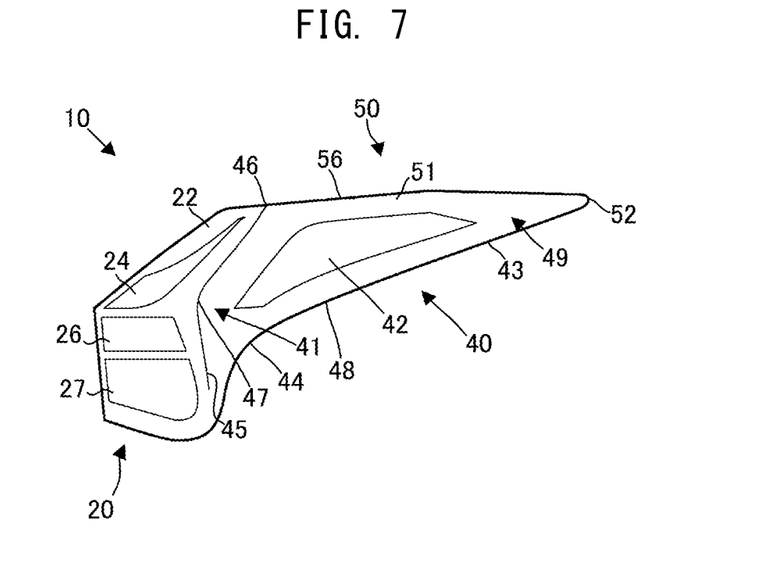
FIG. 7 is a side view showing the rear combination lamp case in the embodiment according to the present invention.

At an opposite side of the junction 46, it is formed an inclined portion 43 which is gradually inclined downward in a rear direction of the vehicle 100 from a front end portion 52 of the planner plate 50. The inclined portion 43, as shown in FIG. 7, has a constitution that the inclined portion 43 rapidly descends while setting a bent portion 44 formed in an obtuse angle as an inflection point.

Figure 9A:
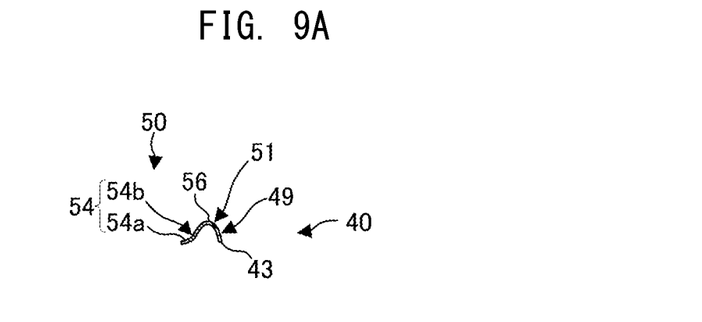
FIG. 9A is an end view showing the rear combination lamp case in the embodiment according to the present invention, the rear combination lamp case being sectioned along A-A cutting line in FIG. 8.
Figure 9B:
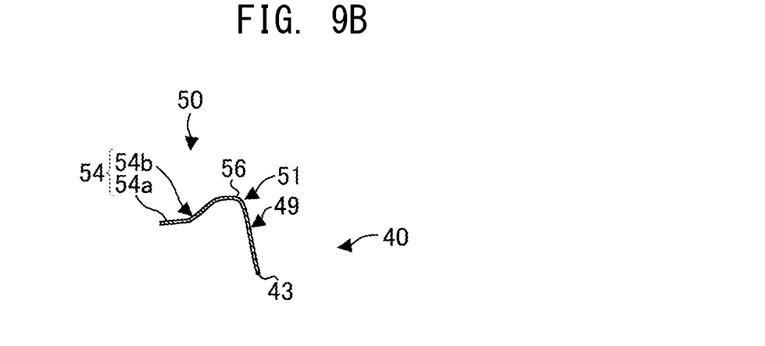
FIG. 9B is an end view showing the rear combination lamp case in the embodiment according to the present invention, the rear combination lamp case being sectioned along B-B cutting line in FIG. 8.
Figure 9C:
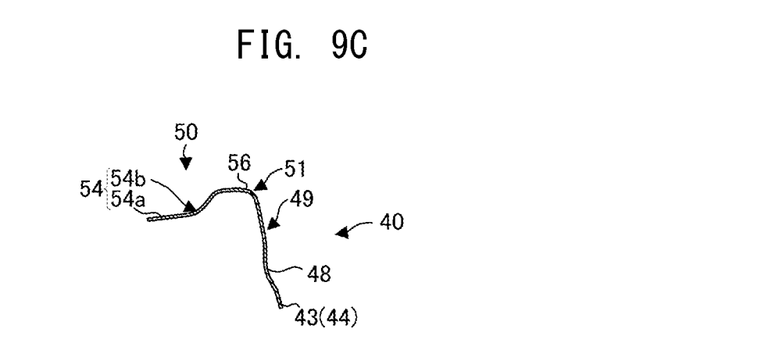
FIG. 9C is an end view showing the rear combination lamp case in the embodiment according to the present invention, the rear combination lamp case being sectioned along C-C cutting line in FIG. 8.
Figure 9D:
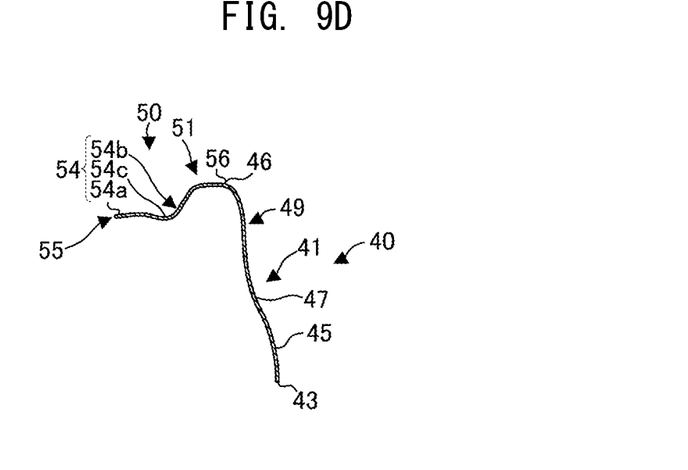
FIG. 9D is an end view showing the rear combination lamp case in the embodiment according to the present invention, the rear combination lamp case being sectioned along D-D cutting line in FIG. 8.

In an outer side face 49 of the side plate 40, as shown in FIG. 9D, an air communication path 41 having a constant width is formed over a reference 48 (see FIGS. 7 and 9C) provided on the inclined portion 43 between the front end portion 52 and the bent portion 44 from a ridgeline center portion 47 formed at the substantial center portion in up and down direction of the side end ridgeline portion 45. This air communication path 41, as shown in the end view of FIG. 9D, is substantially formed in a concave shape. Thus, the air communication path 41 functions so as to control air flow passing from a front to a rear when driving the vehicle 100.

On an inner side of the side plate 40, that is, near the upper end of the vehicle 100 side face within the rear combination lamp case 10, a reflection plate 42 is installed in the vehicle body B. The reflection plate 42 is constituted in a substantial similar shape to each side (substantial triangle portion enclosed by the side end ridgeline portion 45 and the ridgeline portion 56) forming the substantial triangle portion in side view of the side plate 40.

Figure 3:
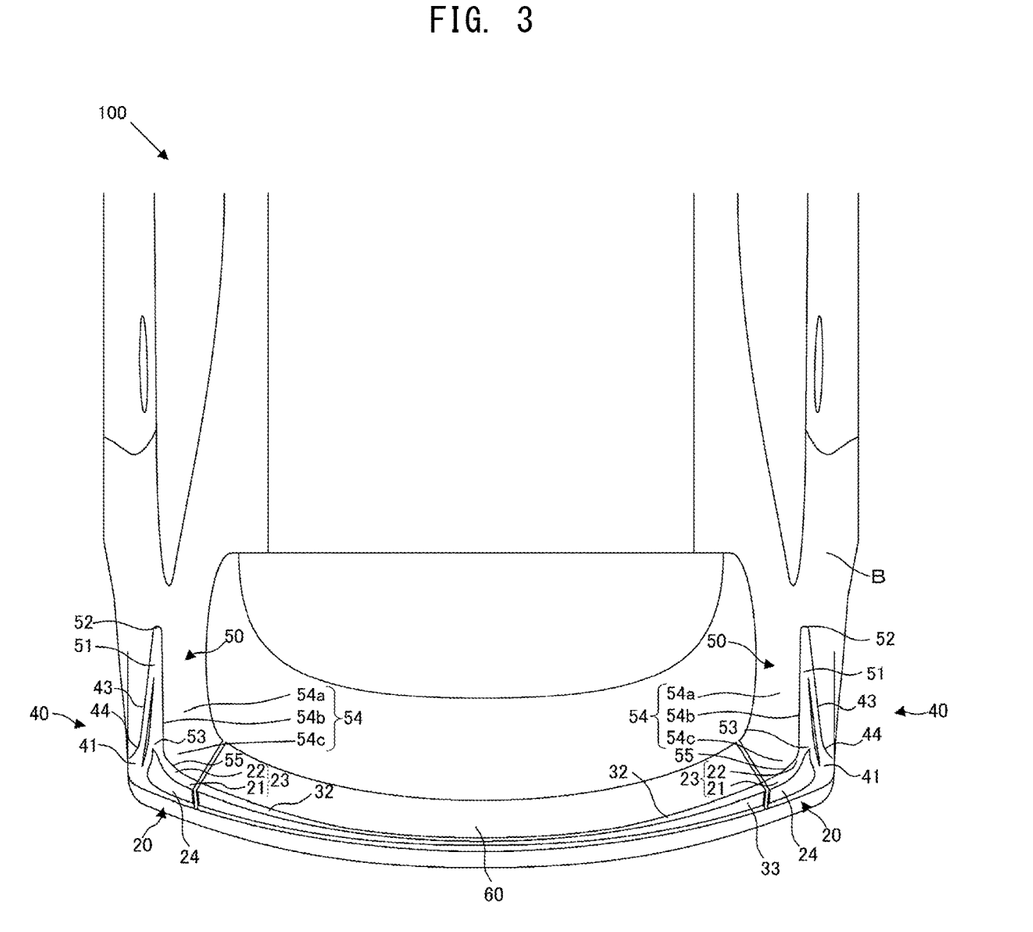
FIG. 3 is a plan view of the vehicle rear potion of the automobile in the embodiment according to the present invention.
Figure 8:
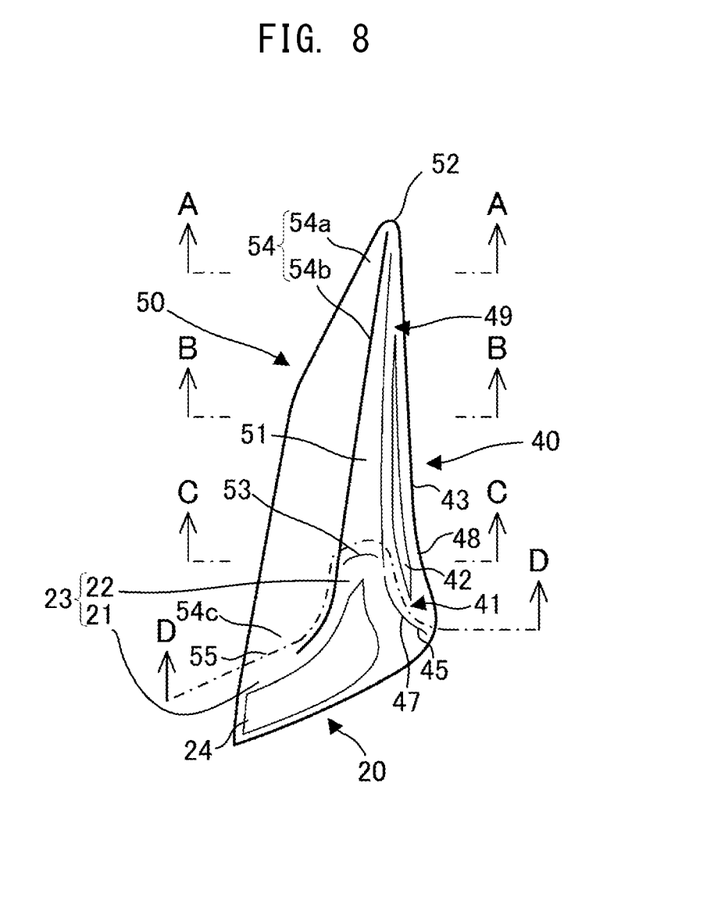
FIG. 8 is a plan view showing the rear combination lamp case in the embodiment according to the present invention.

The planner plate 50, as shown in FIGS. 3 and 8, has a substantial triangle shape in planner view and is constituted from the protrusive ridge portion 51 (see FIGS. 9D and 9F) formed by extending the protrusion 22 of the rear plate 20 with the substantial same shape in rear view toward the front side of the vehicle 100, the front end portion 52 to separate air passing toward a rear from a front of the vehicle 100 into left and right side faces of the protrusive ridge portion 51 and a concave air communication path 54 to pass air flowing in from the front end portion 52 toward the rear of the vehicle 100.

The protrusive ridge portion 51 is constituted so as to gradually become wider width in the inner direction of the vehicle 100 in planner view toward the rear of the vehicle 100 from the front end portion 52. A rear end portion 53 of the protrusive ridge portion 51 is smoothly connected with the protrusion 22 by forming in the substantial same shape to the protrusion 22 in rear view. Thus, the protrusive ridge portion 51 is constituted so as not to inhibit air flow when driving the vehicle 100.

The front end portion 52, as shown in FIGS. 7, 8 and 9A, is formed in a round shape so as to become an arc shape in side view, in planner view and in sectional end view. Therefore, the front end portion 52 can separate fluid F communicating from the front when driving the vehicle 100 into left and right side face portions of the protrusive ridge portion 51. That is, as shown in FIG. 9A, the fluid F is separated into the outer side face 49 of the side plate 40 and the upper face of the concave air communication path 54, thereafter passes toward the rear of the vehicle 100.

This concave air communication path 54, as shown in FIGS. 8 and 9D, is constituted from a planner portion 54a, a R-shaped face portion 54b with a substantial arc shape in sectional view and a concave face portion 54c with a substantial concave shape.

As shown in FIG. 8, the planner portion 54a is formed so as to gradually become wider width toward the inner side of the vehicle 100 as going to the rear of the vehicle 100 from the front end portion 52.

Concretely, the planner portion 54a, as shown in FIG. 9A, is formed so as to become a plane with a narrower width near the front end portion 52. Next, at the place shifted to the rear side of the vehicle 100 than the cutting line A, as shown in FIG. 9B, the planner portion 54a is formed so as to extend toward inner side in left and right direction of the vehicle 100. Next, at the place shifted to the rear side of the vehicle 100 than the cutting line B, as shown in FIG. 9C, the planner portion 54a is further formed so as to extend toward the inner side in left and right direction of the vehicle 100. Next, as shown in FIG. 9D, the planner portion 54a near the rear end portion 55 has a width as same as the width of the planner portion 54a at a point of FIG. 9C and the planner portion 54a is formed so as to shift to the inner side in left and right direction of the vehicle 100 according to that the concave face portion 54c mentioned later is formed.

As mentioned above, the planner portion 54a is formed so as to gradually enlarge toward inner side in left and right direction of the vehicle 100 from the front end portion 52 to the rear end portion 55. Thereby, it concludes that the planner portion 54a is formed so that flow path area of the fluid F when driving the vehicle 100 is gradually enlarged.

Further, the R-shaped face portion 54b, as shown in FIG. 9A, is arranged between the protrusive ridge portion 51 and the planner portion 54a and a cutting end face shape of the R-shaped face portion 54b is formed in a substantial arc shape. This R-shaped face portion 54b, as shown in FIGS. 9A, 9B, 9C and 9D, is always formed with a constant curvature radius from the front end portion 52 to the rear end portion 55. Therefore, the flow path area of the fluid F passing toward the rear while contacting with the protrusive ridge portion 51 when driving the vehicle 100 becomes constant, thereby a pressure toward left and right direction occurring in the protrusive ridge portion 51 can be always made constant.

The concave face portion 54c, as shown in FIG. 8, positions near the rear end portion 55 and, as shown in FIG. 9D, the concave face portion 54c is a hollow formed between the planner portion 54a and the R-shaped face portion 54b. The rear end portion 55 and the notch portion 21, as shown in FIG. 9E, are smoothly continues.

Figure 9E:
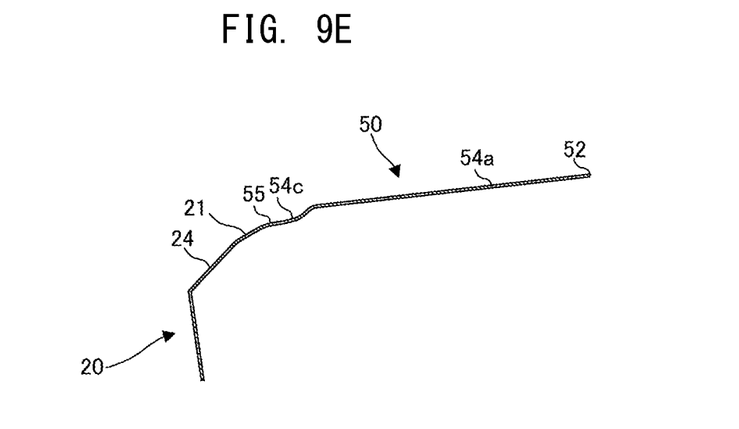
FIG. 9E is an end view showing the rear combination lamp case in the embodiment according to the present invention, the rear combination lamp case being sectioned along E-E cutting line in FIG. 6.
Figure 9F:
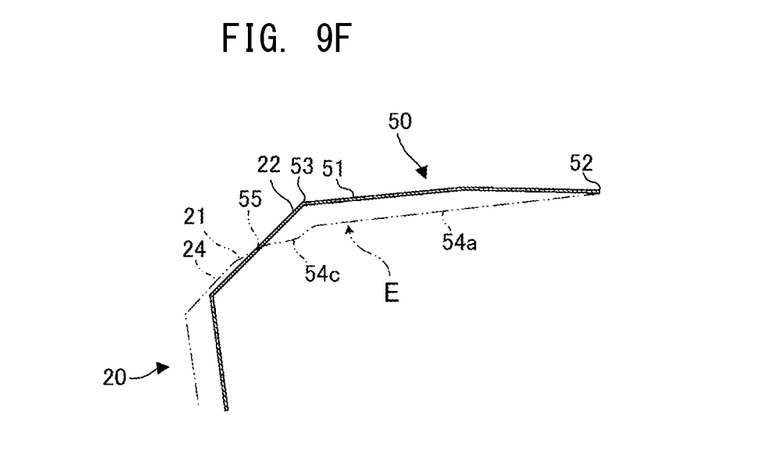
FIG. 9F is an end view showing the rear combination lamp case in the embodiment according to the present invention, the rear combination lamp case being sectioned along F-F cutting line in FIG. 6.

The concave air communication path 54, as shown in FIG. 9E, is gradually inclined downward from the front end portion 52 to the rear end portion 55. The inclination angle increases in the hollow of the concave face portion 54c near the rear end portion 55, thereby the flow path area against up and down direction of the fluid F passing the upper face of the concave air communication path 54 is enlarged. Therefore, downforce occurs at the rear end portion 55 of the concave air communication path 54, thereby it is reduced possibility that rear wheels of the vehicle 100 rises up from the road surface.

Further, as shown in FIG. 1, the non-lighting area 30 is arranged between the rear combination lamp cases 10, 10 provided at left and right end portions in the rear of the vehicle 100.

The non-lighting area 30 is formed in a substantial rectangular shape in rear view and has a notch portion 31 with a horizontal long shape at the substantial center lower portion. Further, it is formed an inclination portion 32 inclined downward toward the rear from the front of the vehicle 100 at the left and right upper end portions of the non-lighting area 30.

Further, on inner side of the non-lighting area 30, that is, near the upper end portion in the rear side of the vehicle 100, it is provided a reflection plate 33 with a rectangular shape in rear view from one end portion of the non-lighting area 30 to the other end thereof in left and right direction. This reflection plate 33 is arranged continuously to the reflection plate 24 formed on the rear plate 20 mentioned above, thereby it can be given an impression as if the non-lighting area 30 and the rear combination lamp cases 10, 10 integrally forms a rear wing.

Further, fog lamps 34 are provided near left and right end portions of the notch portion 31. The fog lamp 34 has a substantial rectangular shape in rear view and is arranged under lower portion of the reflection plate 33. As shown in FIG. 3, the fog lamps 34 are arranged on steps (not shown) in stepwise shape in planner view formed along an arcuate shape in planner view at the rear end portion of the vehicle body B. Further, condenser lens (not shown) is arranged behind the fog lamps 34, thereby it is adopted constitution that visibility for a backward vehicle is improved when lighting and brightness equal to the conventional lamps can be realized in a case of low output.

Further, a baggage room at the vehicle rear is arranged in front of the non-lighting area 30 and, to this baggage room, the openable and closable back door 60 is formed, as shown in FIGS. 1, 2, 3 and 4.

Based on that the rear portion of the vehicle 100 is constituted in the above, passing flow path of the fluid F (air) passing from the vehicle front can be controlled. Control contents of this passing flow path will be described in detail with reference to FIGS. 10 and 11. In addition, it will be described below the reason why degree of freedom in design of the rear combination lamp case 10 is improved.

The vehicle 100 collides with the fluid F having a predetermined flow speed corresponding to driving speed thereof toward the rear from the front when driving. This fluid F contacts with the front end portion 52 of each protrusive ridge portion 51 formed in each of the rear combination lamp cases 10, 10 which are arranged in the rear of vehicle 100, thereby the fluid F is separated in left and right side faces of each protrusive ridge portion 51, that is, in the outer side face 49 of the side plate 40 and the upper face of the concave air communication path 54 on the planner plate 50, thereafter the fluid F flows to the rear of the vehicle 100.

Flow path area of the fluid F in left and right direction is reduced by the protrusive ridge portion 51 and the fluid F becomes a dense state on the outer side face 49 of the side plate 40 and the upper face of the concave air communication path 54, thereby flow speed thereof increases. As a result, the fluid F becomes a dense state on the outer side face 49 of the side plate 40 and the upper face of the concave air communication path 54 and flow speed thereof increases. As a result, negative pressure occurs in the flow speed increase portion of the outer side face 49 of the side plate 40 and the concave air communication path 54. Here, since the negative pressure equal to the left and right occurs on both the left and right faces of the protrusive ridge portion 51, that is, on the inner side face (concave air communication path 54) and the outer side face (outer side face 49), the protrusive ridge portion 51 is pulled by force equal to the left and right when driving the vehicle 100 and both forces counteract. Therefore, it will be reduced possibility that running of the vehicle 100 is hindered due to that the vehicle 100 is pulled in either of left and right directions.

Further, in a case that the vehicle 100 shifts the body to the left direction as lane change when straightly running, the flow path area is reduced on the left side face of the protrusive ridge portion 51 against running direction than on the right side face, thereby negative pressure state occurs. As a result, the rear portion of the vehicle 100 is pulled in the left side based on pressure difference occurring on the inner side face (concave air communication path 54) of the protrusive ridge portion 51 and the outer side face (outer side face 49). Therefore, handle operation in lane change is promoted and lane change can be easily conducted.

Further, a driver feels that pressure change corresponding to the starting point in lane change existing to the most left direction occurs when the driver conducts lane change to the left side in the running direction and thereafter feels that displacement amount gradually decreases according to proceeding of lane change. Therefore, although pressure difference of the vehicle 100 to the left direction occurs at the end of lane change and the vehicle 100 is also pulled to the left side, the driver remembers the pulling force at the start as a feeling. Since the pulling force difference to the left direction at the start and the end is large, the driver is hard to feel that pulling occurs by the negative pressure to the left side at the end of lane change, thereby it can be given an impression of easy operation.

Therefore, steering stability in driving of the vehicle can be secured in any case of straight driving and moving in left and right direction such as lane change.

It will be described below lift and negative lift of the vehicle 100 when driving the vehicle occurring by the concave notch portion 23 formed in the rear plate 20 and the concave air communication path 54 formed in the planner plate 50.

The concave air communication path 54 formed on the upper face of the planner plate 50 is gradually inclined downward from the front end portion 52 to the rear end portion 55 of the rear combination lamp case 10 (see FIG. 9E) and the flow path area through which the fluid F passes increases and the flow speed of the fluid F decreases according to that the fluid F flown in the front end portion 52 of the concave air communication path 54 proceeds to the rear end portion 55 of the concave air communication path 54. As a result, the upper face of the concave air communication path 54 becomes positive pressure and negative lift gradually rises up according to that the fluid F proceeds from the front end portion 52 of the concave air communication path 54 to the rear end portion 55. That is, it concludes that the rear portion of the vehicle 100 is pressed down to the road surface by the fluid F, thereby there is an effect that steering stability can be improved by improving grip force of tires at driving.

Further, the rear end portion 55 of the concave air communication path 54 is constituted so as to be gradually inclined downward from the front end portion 52 to the rear end portion 55, thereby frictional resistance between the rear combination lamp case 10 and the fluid F is reduced. As a result, the separation point where the fluid F separates from the rear combination lamp case 10 can be shifted in the rear, thereby negative pressure area occurring in the rear of the vehicle 100 can be decreased and resistance force can be reduced.

Figure 10:
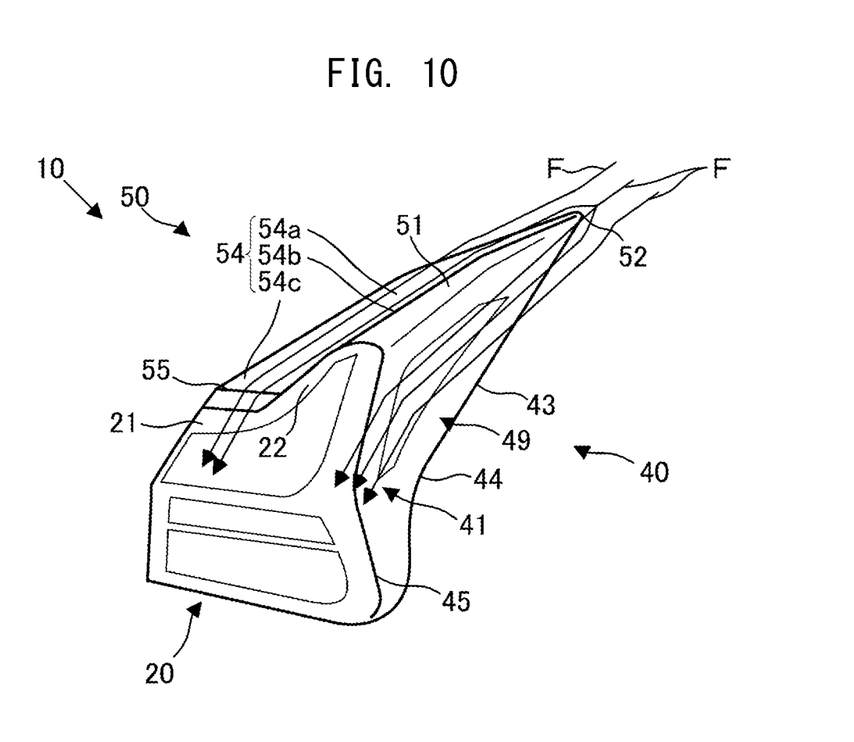
FIG. 10 is a perspective view showing fluid flow in a rear end portion of a left side face in the embodiment according to the present invention.
Figure 11:
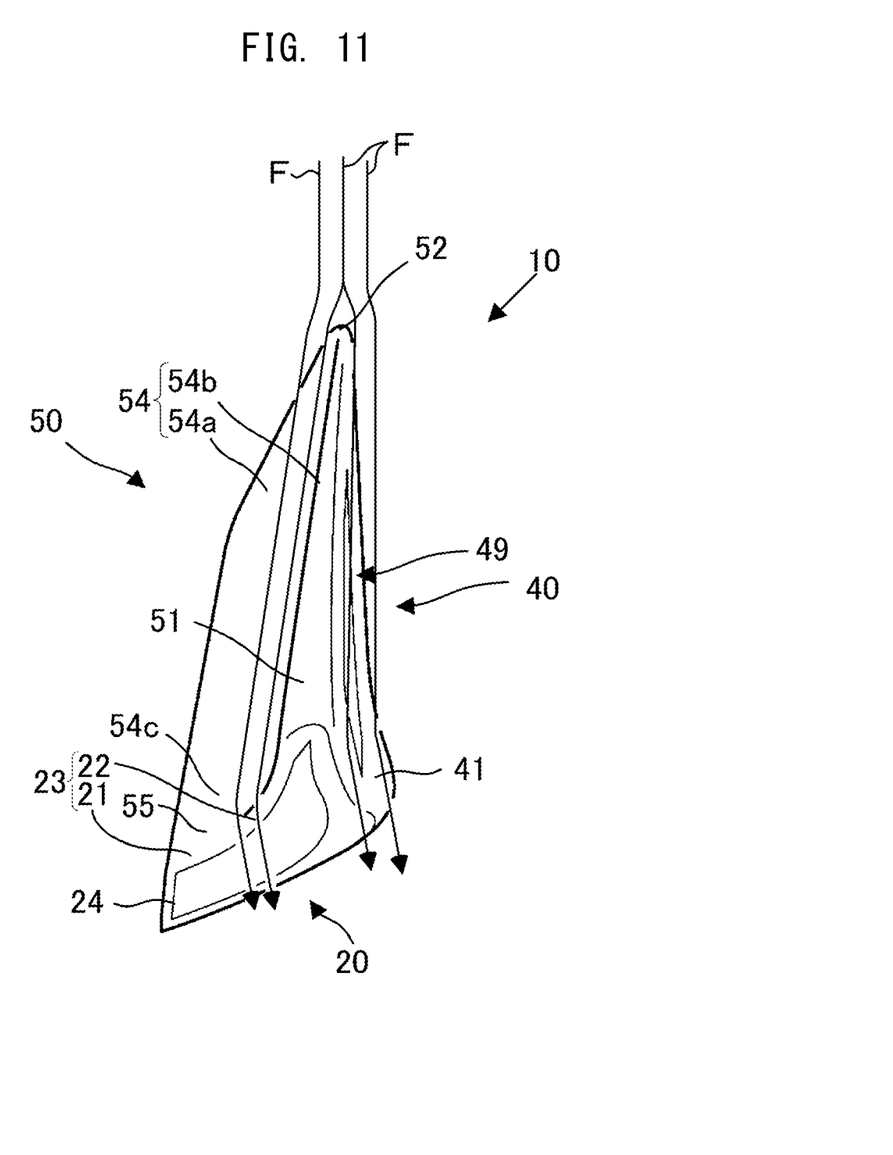
FIG. 11 is a plan view showing the fluid flow in the rear end portion of the left side face in the embodiment according to the present invention.

Further, as shown in FIG. 10, in the present invention, steering stability of the vehicle 100 can be secured in a case that the protrusive ridge portion 51, the concave air communication path 54 and the protrusion 22 are formed in the rear combination lamp case 10, therefore the shape of resin parts (side plate 40 in the present invention) formed at the rear side face portions of the vehicle 100 can be voluntarily selected. Thus, resin area on which the side plate 40 of the rear combination lamp case 10 is formed can be decreased and the side face portion of the vehicle 100 can be changed to metal having high processing accuracy. Accordingly, degree of freedom in design of the rear combination lamp case 10 can be improved and strength of the side face portion of the vehicle 100 can be improved by the present invention.

Here, the present invention is not limited to the embodiment mentioned above and it is included in the scope of the present invention the constitution in which each constitution disclosed in the above embodiment is mutually substituted or combination thereof is changed or the constitution in which each constitution disclosed in well-known invention or the above embodiment is mutually substituted or combination thereof is changed. Further, the scope of the present invention is not limited to the above embodiment and is extended to matters described in claims of utility model application and equivalents thereof.

The invention claimed is:

1. A case structure for a rear combination lamp in an automobile in which a rear combination lamp case in a corner portion formed in a rear portion of a vehicle is formed in a corner case having a substantial triangle pyramid shape by a rear plate, a side plate and a planner plate,
   wherein the rear plate forms a case rear face on which a concave notch portion is formed in a substantial center,
   wherein the side plate forms an air communication side face which is formed so as to gradually become narrower width toward a rear thereof, and
   wherein the planner plate forms a concave air communication path in a center thereof so that a terminal end of the concave air communication path communicates with the concave notch portion of the rear plate.

2. The case structure according to claim 1,
   wherein the concave air communication path formed in the planner plate is formed so as to gradually become wider width from a front to a rear thereof.

\* \* \* \* \*